United States Patent [19]
Malm

[11] Patent Number: 5,772,827
[45] Date of Patent: Jun. 30, 1998

[54] TRIM MEMBER INCLUDING INTERMITTENT BRIGHT STRIP AND METHOD OF MAKING SAME

[75] Inventor: Douglas N. Malm, Northville, Mich.

[73] Assignee: The Standard Products Company, Cleveland, Ohio

[21] Appl. No.: 591,313

[22] Filed: Jan. 25, 1996

[51] Int. Cl.[6] .................................................. B60R 13/04
[52] U.S. Cl. .................................. 156/244.11; 52/716.5; 156/244.12; 156/244.18; 264/176.1; 428/31
[58] Field of Search .................... 156/244.18, 244.11, 156/244.12; 52/716.5; 264/176.1; 428/31

[56] References Cited

U.S. PATENT DOCUMENTS

| | | | |
|---|---|---|---|
| 3,755,052 | 8/1973 | Dressler | 428/31 X |
| 3,765,817 | 10/1973 | Ancker | 425/325 |
| 4,318,764 | 3/1982 | Van Manen | 156/244.12 X |
| 4,428,156 | 1/1984 | Malm et al. | 52/730.4 |
| 5,023,033 | 6/1991 | Cakmakci | 428/31 X |
| 5,149,478 | 9/1992 | Malm | 428/31 X |
| 5,171,499 | 12/1992 | Cehelnik et al. | 156/244.18 X |
| 5,226,998 | 7/1993 | Few | 428/31 X |
| 5,336,345 | 8/1994 | Gustafson et al. | 428/917 X |
| 5,409,653 | 4/1995 | Malm | 156/244.18 X |
| 5,478,516 | 12/1995 | Malm et al. | 156/244.18 X |

*Primary Examiner*—Henry F. Epstein
*Attorney, Agent, or Firm*—Harness, Dickey & Pierce, P.L.C.

[57] ABSTRACT

A method of forming a trim strip product that includes intermittent sections of a bright or color strip coextruded with a clear or translucent thermoplastic melt stream to produce the trim strip having spaced-apart sections of the bright or colored strips. Sections of the bright or colored strips are intermittently placed between two continuous thermoplastic melt strip streams as the melt streams are directed into a pair of cooperating forming rolls. The extruded strip product is then cut at desirable locations such as between the bright or colored strip sections.

20 Claims, 2 Drawing Sheets

U.S. Patent     Jun. 30, 1998     Sheet 1 of 2     5,772,827
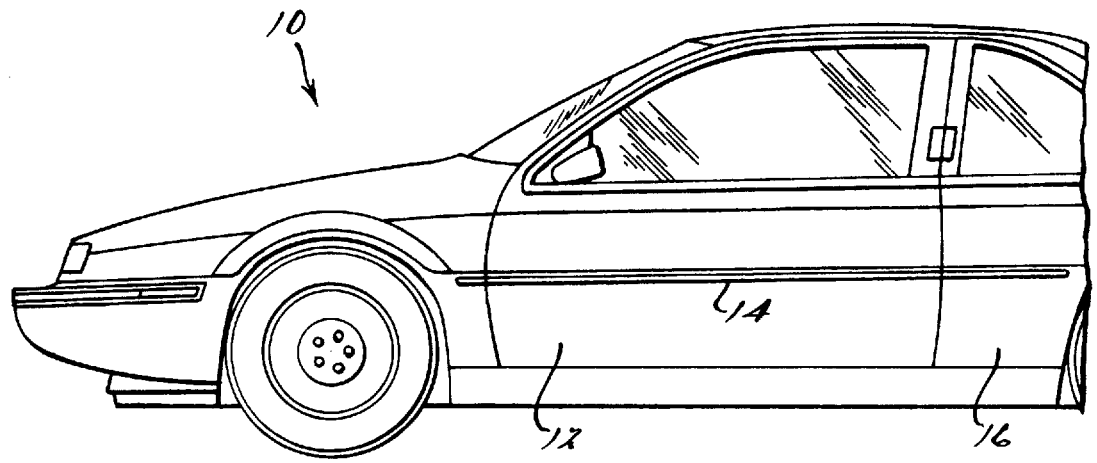
FIG. 1.
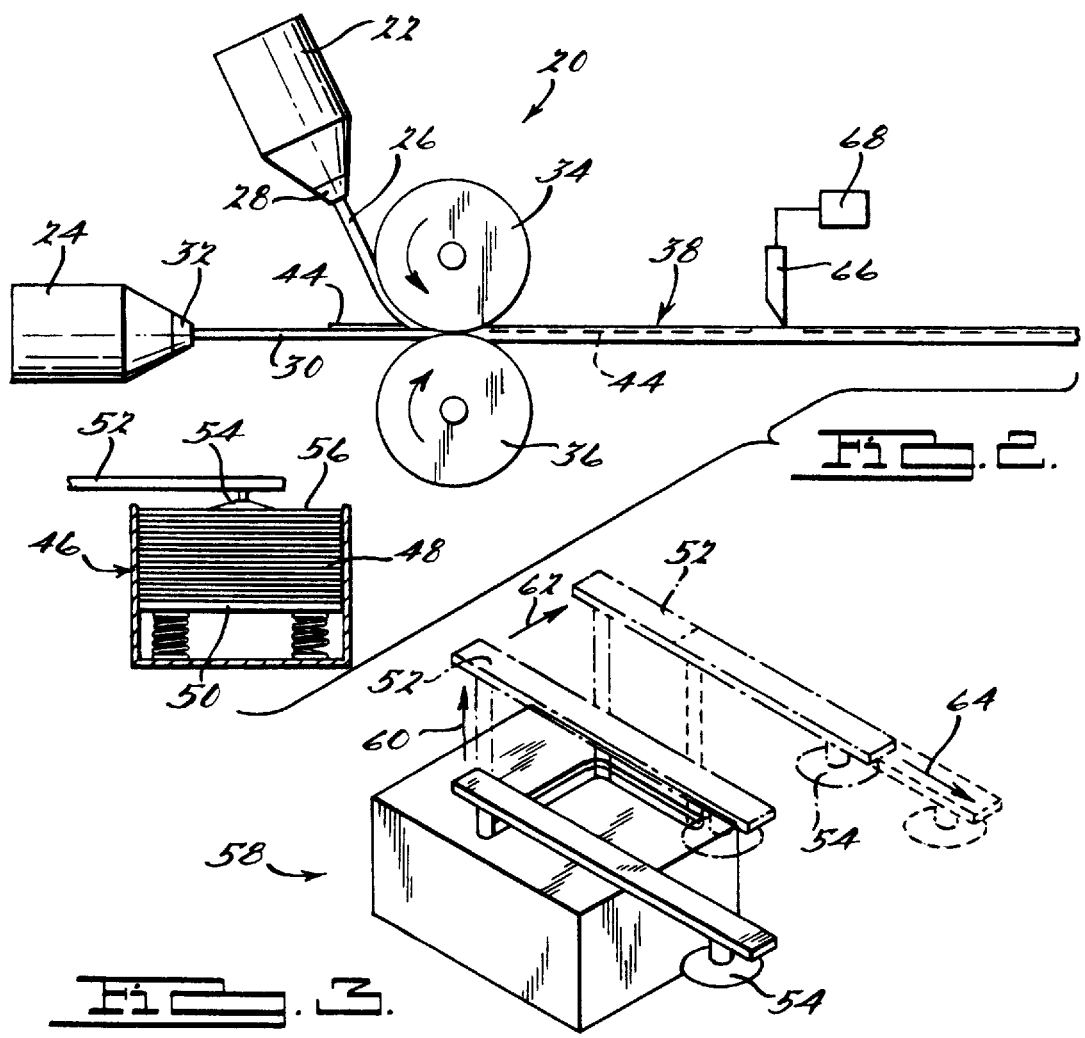
FIG. 2.
FIG. 3.

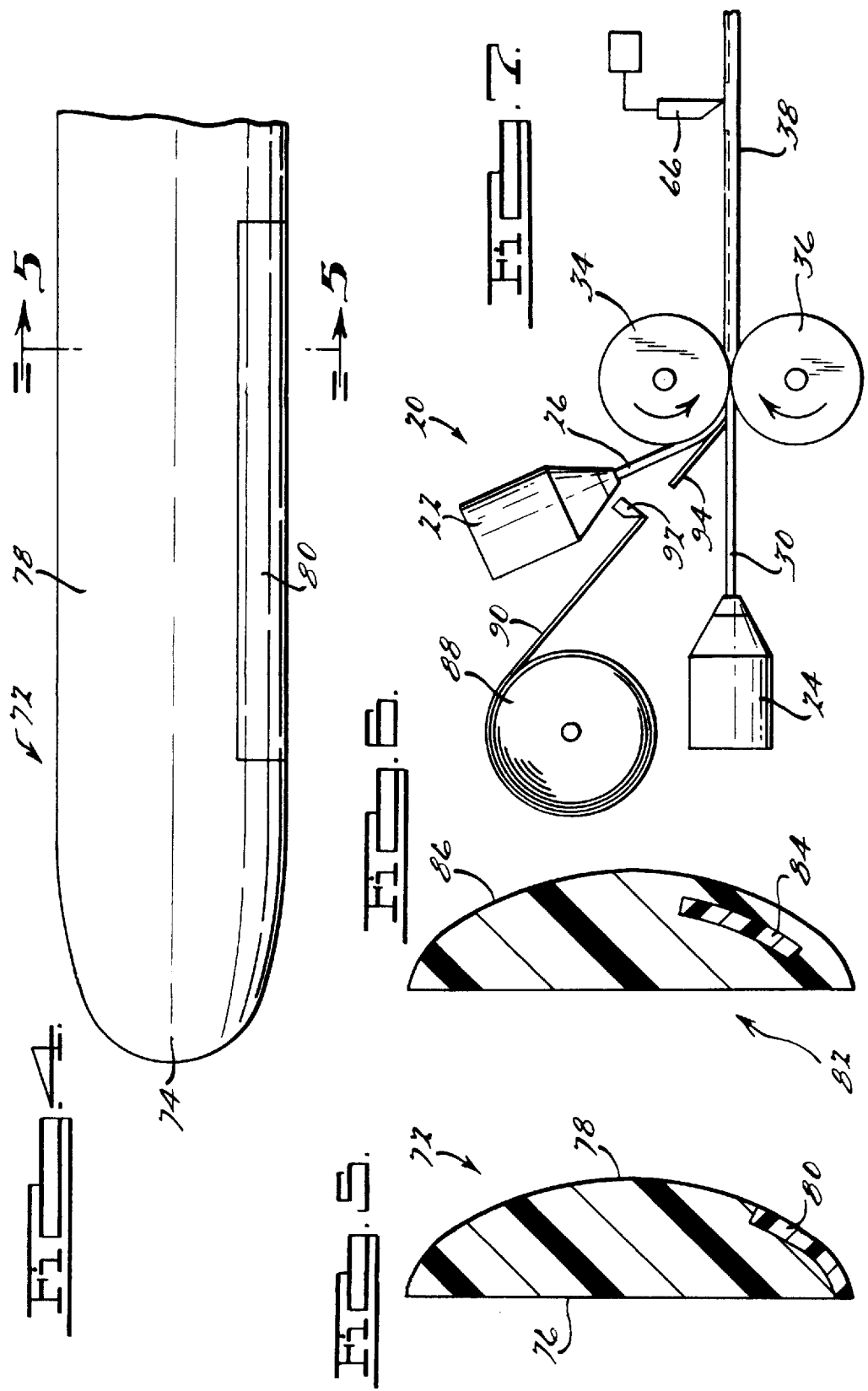

5,772,827

TRIM MEMBER INCLUDING INTERMITTENT BRIGHT STRIP AND METHOD OF MAKING SAME

BACKGROUND OF THE INVENTION

1. Field of the Invention

This invention relates generally to a method of producing a trim strip member including a bright strip insert and, more particularly, to a method of producing a trim strip member including intermittent bright or contrasting strip insert sections by coextruding spaced apart sections of a bright or colored strip between two continuous thermoplastic melt streams, and later cutting trim strip sections from the continuous extrusion such that the trim strip sections include spaced apart bright strip sections.

2. Discussion of the Related Art

Decorative and protective trim strips formed from thermoplastic materials that protect vehicle doors, and provide an aesthetically pleasing appearance are common in the automotive industry. Trim strips of this type can be formed by both injection molding processes and extrusion processes. Trim strips formed by extrusion processes have become increasingly more popular because of the versatility, efficiency and cost effectiveness of forming thermoplastic materials by known extrusion processes.

To form trim strips by an extrusion process, generally one or more continuous, pliable thermoplastic melt streams from suitable extrusion dies are introduced into a pair of cooperating forming rolls which mold the melt streams into a continuous extrusion having a desirable shape. Trim members are then cut from the continuous extrusion after the continuous extrusion has sufficiently cooled. In one type of an extrusion process to produce trim strips, a flat base layer melt stream is coextruded onto an upper show surface layer melt stream having a desirable aesthetically pleasing shape. The show surface material can be of various materials suitable for the extrusion process, including Mylar, chrome, or a show thermoplastic grade material. For some extruded trim strip members, it has been known to incorporate bright strips or colored strips as the show layer, coextruded with a thermoplastic backing layer to provide an aesthetically enhanced trim strip member.

By the nature of the extrusion process, the resulting continuous extrusion has a cross-sectional shape that is the same throughout its entire length. Further, the melt streams that are introduced into the forming rolls have heretofore been continuous streams. However, it may be desirable to coextrude noncontinuous sections within the resulting extrusion to form trim strip products that have a different aesthetic appearance than is currently available.

U.S. patent application Ser. No. 08/544,674, filed Oct. 18, 1995, titled Method of Intermittent Length Stabilization, assigned to the assignee of the instant application and herein incorporated by reference, discloses an extrusion process in which intermittent lengths of a stabilizing member are coextruded between two continuous thermoplastic melt streams. The resulting continuous extrusion is then cut between the intermittent lengths of the stabilizing members so that trim strip lengths are separated from the continuous extrusion in a manner that ends of the trim strip lengths do not include stabilizing portions. The stabilizing members within the trim strip members provide length stabilization, i.e., prevent the trim strip from shrinking during cooling, and at the same time allow the trim strip sections to undergo end forming processes without interference from the stabilizing members.

It would be desirable to provide a method of extruding a trim strip member in which intermittent sections of a bright or colored strip were coextruded along with a clear melt stream so as to provide a more aesthetically pleasing appearance. It is therefore an object of the present invention to provide a method of this type.

SUMMARY OF THE INVENTION

In accordance with the teachings of the present invention, a process of extrusion is disclosed in which intermittent sections of a bright or colored strip are coextruded with a clear or translucent thermoplastic melt stream to produce a trim strip having spaced-apart sections of bright or colored strips. The process includes intermittently placing bright strip or colored strip sections between two continuous thermoplastic melt strip streams as the melt streams are directed into a pair of cooperating forming rolls. The forming rolls mold the thermoplastic melt streams around the bright strip or colored strip sections to define a desirable shape of an extruded strip product. The extruded strip product is then cut at desirable places such as between the bright strip or colored strip sections.

Additional object, advantages and features of the present invention will become apparent from the following description and appended claims, taken in conjunction with the accompanying drawings.

BRIEF DESCRIPTION OF THE DRAWINGS

FIG. 1 shows a cut-away side view of a vehicle including a decorative and protective side trim strip according to an embodiment of the present invention;

FIG. 2 is a side view of an extrusion system showing a process for extruding a trim strip including intermittent bright strip or colored strip sections according to the invention;

FIG. 3 is a perspective view of a positioning device including a positioning arm for positioning a plurality of precut bright strip or colored strip sections stored in a magazine in the extrusion system;

FIG. 4 is a top view of an extruded strip product formed by the process of the invention;

FIG. 5 is a cross-sectional view of the extruded strip product of FIG. 4 along line 5—5;

FIG. 6 is a cross-sectional view of another extruded strip product formed by an extrusion process of the invention; and FIG. 7 is a side view of an extrusion system showing a process for extruding a trim strip including intermittent bright strip or colored strip sections according to another embodiment of the present invention.

DETAILED DESCRIPTION OF THE PREFERRED EMBODIMENTS

The following description of the preferred embodiments directed to a process of coextruding a thermoplastic melt stream with intermittent bright strip or colored strip sections to form an extruded strip product is merely exemplary in nature and is in no way intended to limit the invention or its applications or uses.

FIG. 1 shows a side view of a vehicle 10 including a vehicle door 12. A protective and decorative trim strip 14, formed from a process according to an embodiment of the present invention, is secured to an outer panel of the door 12, and to side panels 16 of the vehicle 10 by appropriate fastening, locating and securing devices (not shown), in a manner that is well understood in the art. The trim strip 14 provides decoration to the vehicle 10, and also protects the paint finish of the vehicle door 12 and the side panel 16 against scratches, scrapes and dings resulting from contact with rigid objects, such as other vehicle doors, around the vehicle 10. As will be discussed in detail below, the trim strip 14 includes intermittent sections of a bright strip or colored strip insert formed by an extrusion process according to the invention.

FIG. 2 depicts an extrusion system 20 that is applicable to produce the trim strip 14. The extrusion system 20 includes a first extrusion die 22 and a second extrusion die 24. The first extrusion die emits a clear melt stream 26 of a suitable material, such as a thermoplastic material, from an orifice 28 of the die 22. Likewise, the second extrusion die 24 emits a base melt stream 30 of a suitable material, such as a thermoplastic material, from an orifice 32 of the die 24. The thermoplastic material that makes up the clear melt stream 26 and the base melt stream 30 can be any suitable material for the purposes described herein, such as a flexible polyvinylchloride, a thermoplastic olefin, a thermoplastic urethane, as well as other types of plastics. However, as will be appreciated by those skilled in the art, other materials are also adaptable to an extrusion process for trim strips associated with vehicles including, but not limited, certain rubbers, chrome, Mylar, etc. For the purposes of the present invention, generally the clear melt stream 26 will be significantly transparent or translucent, and the base melt stream 30 will be opaque. Of course, the melt streams 26 and 30 can be of any transparency depending on their material. The extrusion dies 22 and 24 are intended to represent known types of extrusion dies in the art where a powder, pellet or liquid thermoplastic material is heated to a pliable consistency, and forced out of the orifices 28 and 32 under a pressure to form the streams 26 and 30 to desirable heated plastic consistency. The extrusion dies 22 and 24 can be separate extrusion dies, or a split-stream extrusion die, where the dies 22 and 24 would be part of a single extrusion device, as is well understood in the art.

A pair of cooperating forming rolls 34 and 36 receive the melt streams 26 and 30 to mold the melt streams 26 and 30 into a desirable shape as a continuous extrusion 38. The forming rolls 34 and 36 are driven in a synchronized relationship, and have a cooperating outer surface configuration which defines an opening (not shown) between the rolls 34 and 36 that forms the continuous extrusion 38 to its desired final cross-sectional configuration. In other words, the rolls 34 and 36 mold the heated and pliable melt streams 26 and 30 into the continuous extrusion 38 to have a desirable cross-sectional shape. The orifices 28 and 32 can have a shape that generally defines the cross-sectional shape of the melt streams 26 and 30 to be similar to that of the continuous extrusion 38. The continuous extrusion 38 is then subsequently cooled by a cooling apparatus (not shown). In this example, the material of the melt stream 26 provides a show surface of the continuous extrusion 38, and the material of the melt stream 30 forms a rigid support layer of the continuous extrusion 38 for a product such as the trim strip 14, as is well understood in the art. Also, the melt streams 26 and 30 can be of the same material.

In order to provide a more enhanced appearance to the trim strips formed from the continuous extrusion 38, it is desirable to provide a series of intermittent bright strip or colored strip sections 44 that are intermittently spaced apart and inserted between the melt streams 26 and 30 prior to the melt streams 26 and 30 entering the forming rolls 34 and 36. To accomplish this, a magazine 46 is provided for holding a stack 48 of a plurality of bright strip or colored strip sections that have been cut to a particular length for a particular trim strip application. The bright strip or colored strip sections 44 can be any colored thermoplastic material suitable for the extrusion process described herein, and desirable as an Aesthetically pleasing strip for a trim strip member of a vehicle.

The magazine 46 includes a spring loaded platform 50 that pushes the stack 48 of bright strip or colored strip sections 44 towards a top of the magazine 46 as bright strip sections 44 are removed from the magazine 46. A positioning device arm 52 having a suction head 54 presses down on the top of the stack 48 of sections 44 to remove a top section 56. The suction head 54 first lifts the top section 56 from the stack 48 out of the magazine 46, and then moves the top section 56 substantially directly towards the flow of the melt streams 26 and 30. Once the top section 56 has reached the melt streams 26 and 30, the positioning arm 52 then places the top section 56 between the melt streams 26 and 30, and moves the top section 56 in a direction substantially parallel to the flow of the melt streams 26 and 30. When an end of the top section 56 reaches the forming rolls 34 and 36 from the motion of the positioning arm 52, the top section 56 is grabbed by the forming rolls 34 and 36 and released by the suction head 52. Therefore, the sections 44 are molded between the melt streams 26 and 30 within the continuous extrusion 38, as shown.

FIG. 3 shows a perspective view of a positioning device 58 including the arm 52. The arm 52 is shown at many locations to show the movement of the top section 56 from the magazine 46 to the cooperating rolls 34 and 36. The positioning arm 52 first lifts the top section 56 from the magazine 46 in an upward direction as represented by arrow 60. The positioning arm 52 then moves the top section 56 in a direction substantially perpendicular to the flow of the melt streams 26 and 30 to position the top section 56 between the melt streams 26 and 30, as represented by arrow 62. The positioning arm 52 then moves the top section 56 in a direction parallel to the flow of the melt streams 26 and 30, as represented by arrow 64, such that the top section 56 is pushed into the forming rolls 34 and 36. The positioning arm 52 performs these steps at a fast enough pace such that the sections 44 are separated from each other by a desirable distance. The positioning arm 52 is controlled so that it places the sections 44 at a desirable location between the melt streams 26 and 30 for a particular application. It is stressed that the magazine 46 and the positioning device 58 are used by way of a non-limiting mechanism to insert the sections 44 between the melt streams 26 and 30.

After the continuous extrusion 38 has been at least somewhat cooled, a cutter 66, positioned relative to the continuous extrusion 38, cuts the continuous extrusion 38 into desirable length pieces to form a plurality of extrusion strip sections. The cutter 66 is controlled by a suitable control device 68 so that the cutter 66 cuts sections from the continuous extrusion 38 at the desirable locations. For example, it may be desirable to cut the continuous extrusion 38 between the intermittent strip sections 44 so as to provide trim strip products having a continuous length of a bright strip or colored strip. Alternately, the sections 44 may be of a short enough length such that a single trim strip could include a plurality of intermittent sections. Therefore, as will be appreciated by those skilled in the art, the cutter 66 can cut the continuous extrusion 38 at any desirable location for a desired trim strip product.

FIG. 4 shows a cut-away, top view of a trim strip product 72 separated from the extrusion 38. As is apparent, the strip products 72 has undergone subsequent end processing to form a tapered end 74. End processing of strip products cut from a continuous extrusion are well understood in the art. U.S. Pat. No. 5,149,479 shows one end forming technique of an extruded strip product known in the art. FIG. 5 shows a cross-sectional view along line 5—5 of the trim strip product 72. As shown, the trim strip product 72 includes a flat base layer 76 configured to lay flat against the vehicle 10, and an upper rounded layer 78 as a show surface. The flat base layer 76 is formed from the melt stream 30 and the rounded layer 78 is formed from the melt stream 26. A thin, narrow length of a bright strip section 80 extends along the side of the trim strip product 72 to provide a desirable appearance. For the strip product 72, the continuous extrusion 38 was cut between the sections 44 such that the end 74 does not include a strip section 44 that would interfere with the end forming process.

The location of the bright strip section 80 within the strip product 72 as shown is by way of nonlimiting example. The placement of the section 80 by the process as discussed above can be varied from extrusion to extrusion. For example, FIG. 6 shows a cross-sectional view of a trim strip product 82 including a bright strip section 84, where the bright strip section 84 is at a different location within a top layer 86 than the bright strip section 80 of the strip product 72.

Other mechanisms for positioning bright strips or colored strips between the melt streams 26 and 30 could also be used. It is within the scope of the invention that the system 20 could provide a roll of a bright strip or colored strip material that is unrolled, then later cut to a length by the system 20 before being introduced into the forming rolls 34 and 36. FIG. 7 shows the system 20 in which the magazine 46 has been replaced with a strip roll 88 having a length of a rolled bright strip or colored strips 90. A cutter 92 cuts the strips 90 into precut sections 94 to be positioned between the melt streams 26 and 30 as they are introduced into the forming rolls 34 and 36.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of producing an extruded strip product, said method comprising the steps of:

providing a first melt stream of a thermoplastic material;

providing a second melt stream of a thermoplastic material;

providing a plurality of separate decorative strip sections;

forming the first melt stream of thermoplastic material, the second melt stream of the thermoplastic material and the strip sections into a continuous extrusion having an extrusion length, where the first and second melt streams of the thermoplastic material form a thermoplastic envelope around the separate strip sections such that the strip sections are spaced apart along the length of the extrusion, and wherein the thermoplastic material of the first melt stream is a translucent thermoplastic material so that the decorative strip sections are visible within the continuous extrusion; and cutting the continuous extrusion into sections to form strip products having visible decorative strip sections.

2. The method according to claim 1 wherein the steps of providing the first and second melt streams of a thermoplastic material includes use of a split die extrusion device.

3. The method according to claim 1 wherein the step of forming the first thermoplastic melt stream, the second thermoplastic melt stream and the strip sections into the continuous extrusion includes use of cooperating forming rolls defining a shaped opening.

4. The method according to claim 1 wherein the strip sections are selected from the group of sections consisting of Mylar sections, bright strip sections, colored strip sections, and chrome sections.

5. The method according to claim 1 wherein the step of providing strip sections includes selectively cutting the strip sections from a continuous roll of a strip material and spacing apart the cut strip sections.

6. The method according to claim 1 wherein the step of providing the strip sections includes selectively providing pre-cut strip sections stored in a magazine.

7. The method according to claim 6 further comprising the step of removing independent strip sections from the magazine by a suction device.

8. The method according to claim 7 further comprising the step of using the suction device to position the pre-cut strip section between the first and second melt streams.

9. The method according to claim 1 wherein the strip products are trim strips configured to be secured to an outer surface of a vehicle.

10. The method according to claim 1 wherein the strip products are formed into strip products having a curved upper show layer and a flat lower base layer, and wherein the curved upper show layer is substantially transparent so that the strip sections are visible within the thermoplastic envelope.

11. The method according to claim 1 wherein the step of cutting the continuous extrusion into sections includes cutting the continuous extrusion at desirable locations so as to provide strip products having a predetermined sequence of strip sections.

12. A method of producing an extruded strip product, said method comprising the steps of:

providing a first melt stream of an extrudable material;

providing a plurality of decorative strip sections where the strip sections are selected from the group consisting of Mylar sections, bright strip sections, colored strip sections, and chrome sections; and coextruding the first melt stream of the extrudable material with the strip sections so as to form a continuous extrusion having an extrusion length, wherein the continuous extrusion includes spaced apart strip sections along the length of the extrusion, and wherein the extrudable material of the first melt stream is a translucent material so that the decorative strip sections are visible within the continuous extrusion.

13. The method according to claim 12 further comprising the step of providing a second melt stream of an extrudable material, wherein the step of coextruding the first melt stream of the extrudable material with the strip sections includes extruding the first melt stream, the second melt stream and the strip sections so that the continuous extrusion includes spaced apart intermittent strip sections surrounded by the extrudable material.

14. The method according to claim 13 wherein the step of providing a plurality of strip sections includes selectively providing pre-cut strip sections stored in a magazine.

15. The method according to claim 14 further comprising the steps of removing the pre-cut strip sections from the magazine by a suction device and placing the strip sections between the first and second melt streams.

16. The method according to claim 12 wherein the continuous extrusion is formed by including the use of cooperating forming rolls.

17. A method of producing an extruded strip product, said method comprising the steps of:

providing a first melt stream of an extrudable material;

providing a second melt stream of an extrudable material;

providing a plurality of separate decorative strip sections;

forming the first melt stream of the extrudable material, the second melt stream of the extrudable material and the strip sections into a continuous extrusion having an extrusion length, where the first and second melt streams of the extrudable material form a envelope around the separate strip sections such that the strip sections are spaced apart along the length of the extrusion, and wherein the extrudable material of the first melt stream is a translucent material so that the decorative strip sections are visible within the continuous extrusion; and cutting the continuous extrusion into sections to form strip products having visible decorative strip sections.

18. The method according to claim 17 wherein the step of providing strip sections includes selectively cutting the strip sections from a continuous roll of a strip material and spacing apart the cut strip sections.

19. The method according to claim 17 wherein the step of providing the strip sections includes selectively providing pre-cut strip sections stored in a magazine.

20. The method according to claim 19 further comprising the step of removing independent strip sections from the magazine by a suction device.

* * * * *